United States Patent [19]
Homma et al.

[11] Patent Number: 5,572,678
[45] Date of Patent: Nov. 5, 1996

[54] SYSTEM FOR SENDING FRAMES FROM SENDER TO RECEIVER USING CONNECTIONLESS PROTOCOL AND RECEIVING ACKNOWLEDGING FRAME AND RETRANSMISSION REQUEST FRAME FROM RECEIVER USING CONNECTION ORIENTED PROTOCOL

[75] Inventors: Koichi Homma, Yokohama; Keiji Oshima, Katsuta; Masao Sueki, Hitachi; Takashi Kasama, Yokohama; Toshiya Kagawa, Kawasaki, all of Japan

[73] Assignees: Hitachi, Ltd.; Hitachi Microcomputer System, Ltd., both of Tokyo, Japan

[21] Appl. No.: 8,303

[22] Filed: Jan. 25, 1993

[30] Foreign Application Priority Data

Jan. 24, 1992 [JP] Japan ................................. 4-010764

[51] Int. Cl.⁶ ............................................. G06F 13/00
[52] U.S. Cl. .................. 395/200.12; 370/60; 364/222.2; 364/284.3; 364/284.4; 364/DIG. 1
[58] Field of Search .............................. 395/200, 200.01, 395/200.02, 200.06, 200.12, 200.15; 370/94.1, 94.2, 94.3, 84, 60, 95.1, 85.13, 85.14, 85.1, 110.1, 62

[56] References Cited

U.S. PATENT DOCUMENTS

| | | | |
|---|---|---|---|
| 4,366,479 | 12/1982 | Mori et al. | 370/94 |
| 4,535,448 | 8/1985 | Baxter | 370/85.9 |
| 4,536,877 | 8/1985 | Livingston et al. | 370/94 |
| 4,803,681 | 2/1989 | Takahashi | 370/85 |
| 4,993,024 | 2/1991 | Quinquis et al. | 370/94.1 |
| 5,007,017 | 4/1991 | Kobayashi | 395/200.17 |
| 5,021,949 | 6/1991 | Morten et al. | 395/200.09 |
| 5,025,457 | 6/1991 | Ahmed | 370/100.1 |
| 5,050,162 | 9/1991 | Golestani | 370/60 |
| 5,091,849 | 2/1992 | Davis et al. | 395/100 |
| 5,142,531 | 8/1992 | Kirby | 370/94.3 |
| 5,179,556 | 1/1993 | Turner | 370/94.1 |
| 5,191,583 | 3/1993 | Pearson et al. | 370/94.1 |
| 5,193,151 | 3/1993 | Jain | 395/200.06 |
| 5,197,127 | 3/1993 | Waclawsky et al. | 395/200.11 |
| 5,208,810 | 5/1993 | Park | 370/94.1 |
| 5,224,095 | 6/1993 | Woest et al. | 370/85.13 |
| 5,231,631 | 7/1993 | Buhrke et al. | 370/60 |

(List continued on next page.)

OTHER PUBLICATIONS

The Book of "Local Networks", by William Stallings, 1990, pp. 54–55.
"RFC1045, Versatile Message Transaction Protocol", by D. Cheriton, Feb. 1988, pp. 18–21.
"Internetworking with TCP/IP", by Douglas Conner, 1991, pp. 130, and 192–194.
S. Tsuruta et al., "Proposal and Estimation of Efficient, Reliable and Simple Broadcast Protocol for a Large Amount of Data Transmission", *Proceedings of the Information Processing Society of Japan*, vol. 27, No. 4 (Apr. 1986), pp. 462–470.
A. Kamitani, *Outline of Local Area Network–Ethernet*, Maruzen Co., Ltd., pp. 73 and 151–175.

Primary Examiner—Thomas C. Lee
Assistant Examiner—Moustafa Mohamed Meky
Attorney, Agent, or Firm—Antonelli, Terry, Stout & Kraus

[57] ABSTRACT

Data communication method and system for transmitting a large amount of data via a network such as LAN to which a plurality of stations or terminals are connected, through a simplified processing procedure with high reliability and high efficiency while suppressing influence to other communications. The large amount of data is transmitted from a sender station to a plurality of receiver stations by utilizing a connectionless communication service, while inter-station reception acknowledging/retransmitting processings are performed by using a connection-oriented communication service. The large amount of data to be transmitted is divided into a plurality of blocks, and inter-block delay time is set on the basis of station status factors such as a permissible load increase rate of the CPU of the individual stations.

20 Claims, 12 Drawing Sheets

U.S. PATENT DOCUMENTS

| | | | |
|---|---|---|---|
| 5,243,595 | 9/1993 | Woest et al. | 370/85.13 |
| 5,274,638 | 12/1993 | Michihara et al. | 370/85.6 |
| 5,280,470 | 1/1994 | Buhrke et al. | 370/13 |
| 5,359,320 | 10/1994 | Jaffe et al. | 370/85.3 |
| 5,377,327 | 12/1994 | Jain et al. | 395/200.15 |
| 5,432,798 | 7/1995 | Blair | 371/32 |

FIG. 9

| BLOCK ID NUMBER / CONNECTION ID NO. | 1 | 2 | 3 | ---------- | 15 |
|---|---|---|---|---|---|
| 1 | | | | ---------- | |
| 2 | | | | ---------- | |
| 3 | | | * | ---------- | |

FIG. 10

| AREA FOR BLOCK 1/15 | 2/15 | 3/15 | ---------- | 15/15 |
|---|---|---|---|---|

SYSTEM FOR SENDING FRAMES FROM SENDER TO RECEIVER USING CONNECTIONLESS PROTOCOL AND RECEIVING ACKNOWLEDGING FRAME AND RETRANSMISSION REQUEST FRAME FROM RECEIVER USING CONNECTION ORIENTED PROTOCOL

BACKGROUND OF THE INVENTION

The present invention relates to a method and a system for transferring a large amount of data among a plurality of computer-implemented stations or terminals via a network to which the stations or terminals are connected or linked.

The techniques which the present invention concerns are discussed in A. Kamitani: "Outline of Local Area Network-Ethernet", Maruzen Co. ltd, pp. 73, 151–175 and D. Cheriton "REC1045, VERSATILE MESSAGE TRANSACTION PROTOCOL Protocol Specification" (Feb. 1988), pp. 18–21. In these literatures, there are described methods of performing data transactions among a plurality of computers via a network with high reliability by utilizing a connection-oriented service provided in correspondence to a transport layer of an ISO-OSI reference model for establishing a connection between a sender node and a sink or receiver node, whereon communication is performed on the basis of a highly reliable communication protocol which includes a reception acknowledgement and a flow control. On the other hand, in the case where the connection-oriented service involves a remarkably large communication overhead, a connectionless service provided at the transport layer is directly utilized in a higher level layer to thereby realize a highly efficient and reliable data transaction available owing to a combination with the connectionless service.

Further, there has also been proposed a method of decreasing overruns (loss of data packets received by a sink or receiver node) which may occur when the packet transmission rate is high by providing a delay time (inter-packet gap time) between the successive packets for transmission at the sender side and by feeding back or reflecting a retransmission request issued by the sink or receiver station (node) upon detection of occurrence of the overrun to the inter-packet delay or gap time to thereby effect an automatic regulation of the delay time, as is described in D. Cheriton literature.

In general, for realizing a data transmission with a high reliability, it is a common practice to utilize a reliable communication service such as based on TCP/IP (Transmission Control Protocol/Internet Protocol) by establishing a connection between source or sender node and a sink or receiver node. However, in the case where a large amount of data is to be simultaneously multicast or broadcast to a plurality of sink nodes (or receiver terminals), such situation is often encountered that the connection-oriented communications service of high reliability can no more be utilized, making it necessary to develop a reliable processing procedure by combining the connectionless service with the connection-oriented service on the side of the user. In that case, transmission of a reception acknowledgement, sending of a request for retransmission of required data and the like communication are realized by utilizing the connection-less service. Consequently, in order to cope with error which may occur in the above-mentioned communications, the transmission acknowledgement processing, time-out processing and others must be performed in many folds, making it necessary to provide logics for ensuring a high reliability.

On the other hand, on the presumption that the data buffer areas of the sender/receiver nodes or terminals are usually insufficient for the multicast transmission of a large amount of data, it is proposed that the reception acknowledgement is sent back upon every reception of an information frame. In this conjunction, reference may be made to S. Tsuruta and S. Miyamoto: "Proposal and Estimation of Efficient, Reliable and Simple Broadcast Protocol for a Large Amount of Data Transmission", Proceedings of The Information Processing Society of Japan, Vol. 27, No. 4 (April 1986), pp. 462–470. In this literature, it is pointed out that much complicated logics are required for evading the conflict in the reception acknowledgement transmissions from a plurality of receiver terminals in addition to the logic for the aforementioned processings.

Besides, when a large amount of data are transmitted simultaneously at as high a transmission rate as possible, CPU loads of the computers incorporated in the sender/receiver terminals are increased, whereby other processings such as arithmetic operation or the like performed by the computers are subjected to adverse influence, giving rise to a problem in addition to that of increase in the cost of retransmission due to the overrun taking place in the transmission of large amount of data. Among others, in the case of a computer control system which requires a high reliability, it is necessary to maintain the CPU load rate of the computer constantly at a relatively low level to ensure availability of the computer with a margin in the range, for example, of 30 to 40%. Such being the circumstances, the increase in the CPU load due to the transmission of a large amount of data presents a serious problem with regard to the reliability of the computer control system. Additionally, in most of the computer control systems, inter-computer transfer of measurement/control data is realized by resorting to a memory map transmission through periodical short-interval broadcast while omitting acknowledgement of reception. Consequently, transmission or transfer of the measurement/control data may undesirably be obstructed by the transmission of a large amount of data due to limitation imposed on the available buffer capacity. In the hitherto known transmission rate (interpacket time gap) feed-back system operating on the basis of detection of occurrence of overrun, it is contemplated to optimize the transmission cost involved only in the transmission of the sender terminal, and no consideration is paid to the securement of overall reliability for the communications of the whole system inclusive of other communications and operations in addition to the transmission of large amount of data by preventing the last mentioned data transmission for a given terminal from exerting influence to other communications for that terminal or station.

SUMMARY OF THE INVENTION

It is therefore an object of the present invention to provide a method and a system for transferring a large amount of data among a plurality of computer-equipped stations or terminals (or nodes in more general terms) on a network with high efficiency and high reliability through a simple processing procedure.

Another object of the present invention is to provide a method and a system for transferring a large amount of data among a plurality of computer-equipped terminals or stations while suppressing increase in the CPU load of the computer of the source or sender terminal and preventing the large amount of data transmission from exerting adverse influence to other communications and/or operations performed by that computer.

In view of the above and other objects which will become more apparent as description proceeds, there is provided according to an aspect of the present invention a method and a system for transferring a large amount of data among a plurality of terminals or nodes on a network, in which a plurality of data frames are first successively transmitted through a connectionless transmission facility (protocol), and subsequently reception of a reception acknowledgement data frame or a retransmission request data frame and transmission of a retransmission data frame (i.e., a frame of data to be retransmitted), if necessary, are performed by utilizing a connection-oriented transmission facility (protocol) which can ensure high reliability.

According to another aspect of the present invention, there is provided a method and a system for transmitting a large amount of data, in which a large amount of data to be transmitted is divided into blocks each including a plurality of data packets, and a delay time (or inter-block gap time) is interposed between successive blocks, wherein the delay time is previously so determined that the CPU load increase rate in the individual sink or receiver terminals is maintained lower than a permissible value or no buffer overflow takes place in the communication performed without acknowledgement of reception.

With the arrangements taught by the invention such that a large amount of data is first transmitted by using the connectionless transmission facility (protocol) which can ensure high efficiency at the expense of high reliability and then transmission of the reception acknowledgement data, retransmission request and retransmission of data as required by the retransmission request is performed by utilizing the connection-oriented transmission facility (protocol) which ensures high reliability, there can be realized transmission or transfer of a large amount of data with high reliability through a simplified processing procedure.

By virtue of the second mentioned aspect of the invention, a large amount of data can be transmitted while regulating or adjusting the transmission rate so that the CPU load in the sender/receiver terminals or stations can be maintained constantly lower than a predetermined value. Thus, transmission of a large amount of data can be realized while ensuring high reliability to the system as a whole.

BRIEF DESCRIPTION OF THE DRAWINGS

FIG. 9 is a view showing a structure of a retransmission table;

FIG. 10 is a view for illustrating a method of storing a retransmission frame;

DESCRIPTION OF THE PREFERRED EMBODIMENTS

Now, the present invention will be described in conjunction with preferred or exemplary embodiments thereof. In the following description, it is to be understood that terms such as "sender", "receiver", "source", "sink", "terminal", "station", "channel" and the like are words of convenience and are not to be construed as limiting terms.

Figure 2:
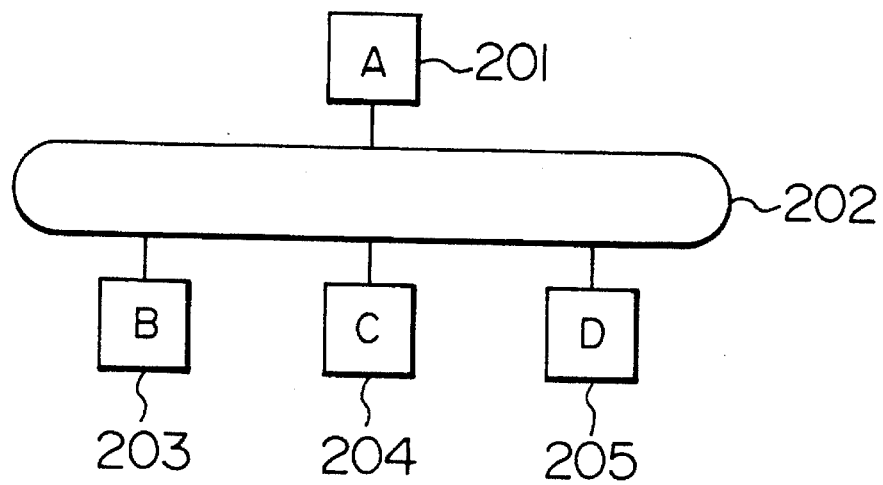
FIG. 2 is a diagram showing only schematically a network structure for explaining the principle underlying an aspect of the invention.

FIG. 2 diagramatically, and only schematically shows a simple network structure for explaining the principle underlying an aspect of the invention. A reference numeral 201 denotes a terminal or a node serving as a sender terminal, 202 denotes a physical communication line along which information frames flow, and reference numerals 203, 204 and 205 denote terminals or nodes serving as receiver terminals, respectively. At this juncture, it is assumed only for convenience of explanation that each of the units mentioned above is constituted by a computer which incorporates a CPU (Central Processing Unit).

Figure 1:
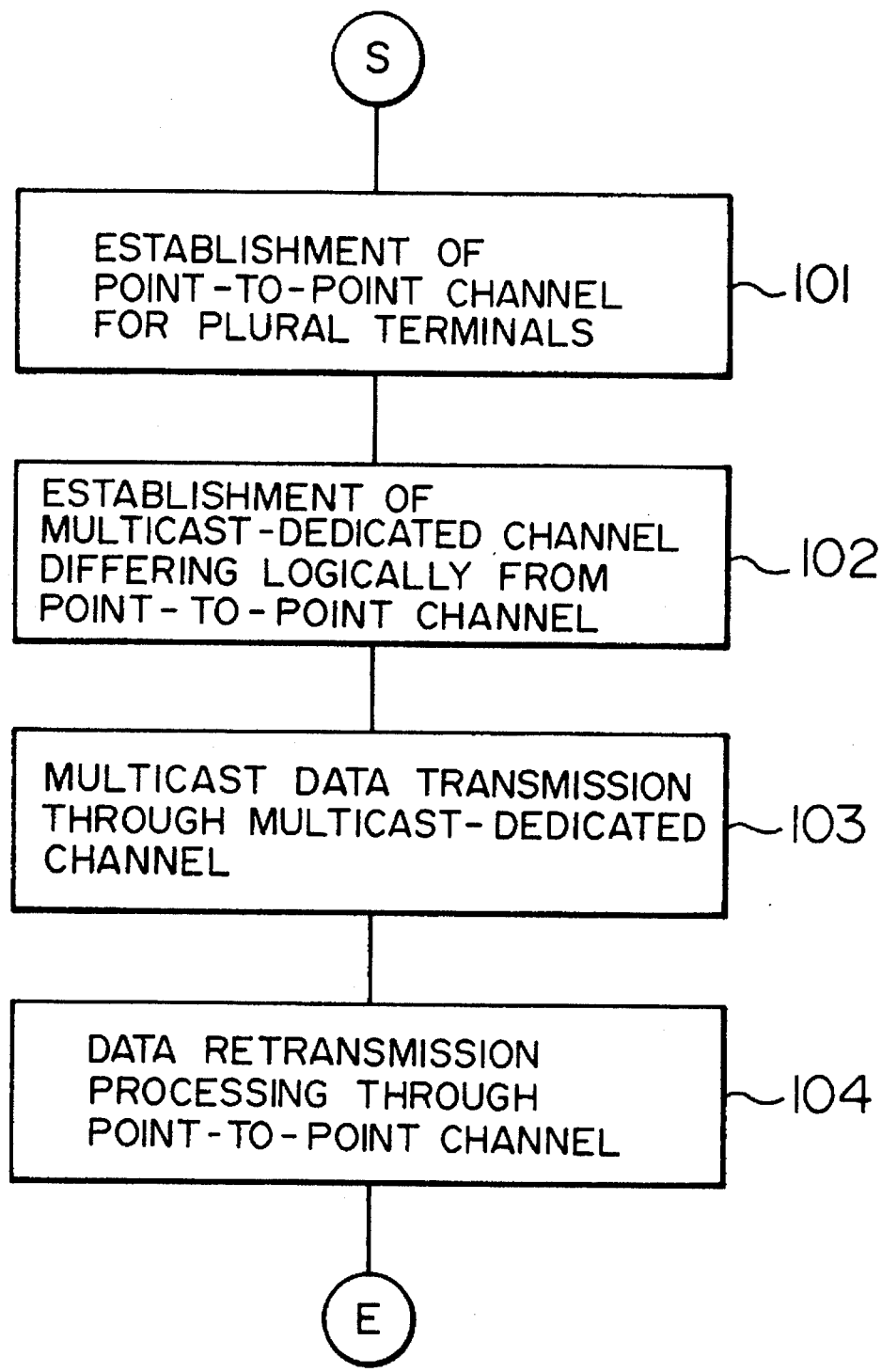
FIG. 1 is a flow chart showing schematically processing operations performed by a sender terminal in a data transmission system according to an embodiment of the invention.

FIG. 1 is a flow chart showing schematically processings performed by the sender terminal (which corresponds to the terminal 201 shown as labeled "A" in FIG. 2) according to an embodiment of the invention.

Referring to FIG. 1 together with FIG. 2, in a step 101, a point-to-point circuit or channel is made (established) for a plurality of receiver terminals (corresponding to the terminals B, C and D denoted by 203, 204 and 205, respectively). In the case of the instant embodiment, it is presumed that TCP/IP (Transmission Control Protocol/Internet Protocol) is adopted as a communication procedure (protocol) for utilization of the point-to-point channel. For more particulars of TCP and IP, reference may be made to RFC793 and RFC791, respectively. Parenthetically, "RFC" is an abbreviation of "Request for Comments" and represents a document number in "DDN Protocol Handbook" published by the SRI International DDN Network Information Center.

The protocol referred to as the TCP/IP is known as a transmission control procedure which can provide a one-to-one communication with a high reliability by making available a communication error check function, a retransmission function upon occurrence of transmission error such as drop-out, falsification and others. According to the TCP/IP protocol, it is required to establish a virtual communication path (or virtual connection) between the sender terminal and the receiver terminal in precedence to effectuating the TCP/IP communication. With the description that the point-to-point channel or circuit is made for a plurality of nodes or terminals, it is intended to mean that virtual connection is established between the terminal A and the terminals B, C and D in the case of the network shown in FIG. 2.

In a step 102 of FIG. 1, there is made or established on one and the same network a multicast channel which logically differs from the channel made in the step 101. In the case of the instant embodiment, as a communication protocol for utilizing the multicast transmission, there is employed a UDP/IP (User Datagram Protocol/Internet Protocol), wherein the UDP is stipulated in RFC763 of DDN Protocol Handbook mentioned above. This protocol is intrinsically lacking in procedure, providing none of the transmission error check function, data retransmitting function upon occurrence of error and the like in the communication control and thus is poor with regard to the reliability of the communication. However, because there is no need for establishing the connection between the sender terminal and receiver terminals, it is possible to send information frames to a plurality of receiver or sink terminals through a single transmitting operation. In contrast, in the case of the TCP/IP communication, a plurality of information transmitting operations are required.

Figure 3A:
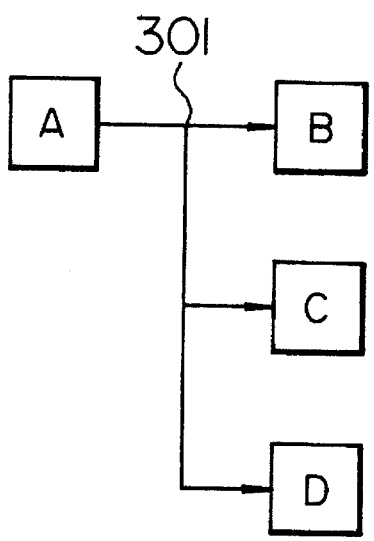
FIG. 3A is a diagram illustrating schematically the concept of a multicast transmission.

In a step 103 of FIG. 1, information frames are sent to a plurality of terminals by utilizing the multicast channel established in the step 102. FIG. 3A is a diagram for illustrating schematically the mode or concept of this multicast transmission. As can be seen from this figure, the information frames sent out from the sender terminal A in the multicast mode are simultaneously transmitted to the receiver terminals B, C and D, as indicated by solid line arrows 301 in FIG. 3A.

Figure 3B:
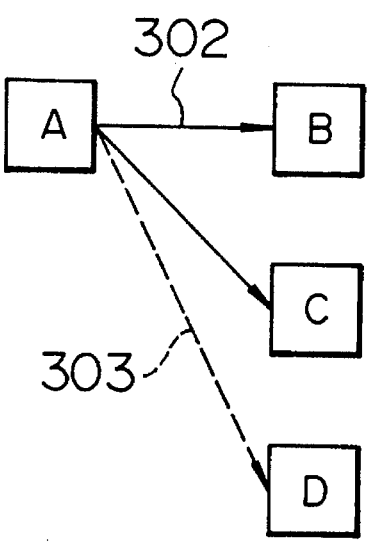
FIG. 3B is a diagram illustrating schematically the concept of a point-to-point transmission.

Although the multicast transmission can enjoy a high efficiency because the information frames can be transmitted to a plurality of sink terminals through a single send-out operation, there may occur drop-out or loss of the information frame due to a communication error because the multicast transmission is lacking of procedure, as mentioned previously. Upon occurrence of such drop-out of information frame, the corresponding information frame must be sent again. Now, in a step 104 of FIG. 1, in response to a retransmission request issued by a destination receiver terminal, a retransmission processing is executed by utilizing the point-to-point channel of a high reliability which has been established in the step 101. However, unless any retransmission request is issued, this step 104 is spared. FIG. 3B is a diagram illustrating schematically the concept or mode of the transmission performed by utilizing the point-to-point channel. In the case of the example illustrated in FIG. 3B, it is assumed that retransmission of the information frame is required for the terminals B and C, as indicated by solid line arrow 302, while for the terminal D, there is no need for retransmitting any information frame. In this conjunction, a phantom line 303 extending from the sender terminal A to the receiver terminal D indicates that no information retransmitting is performed for the terminal D although the connection has been established between these terminals A and D. The sender terminal A first transmits the information frame to the receiver terminal B and then to the receiver terminal C on a one-to-one basis. By utilizing the point-to-point transmission which is based on the TCP/IP for the retransmission of information frame in this way, the information frame sent out again from the sender terminal A can reach the destination receiver terminal(s) without fail.

Figure 4:
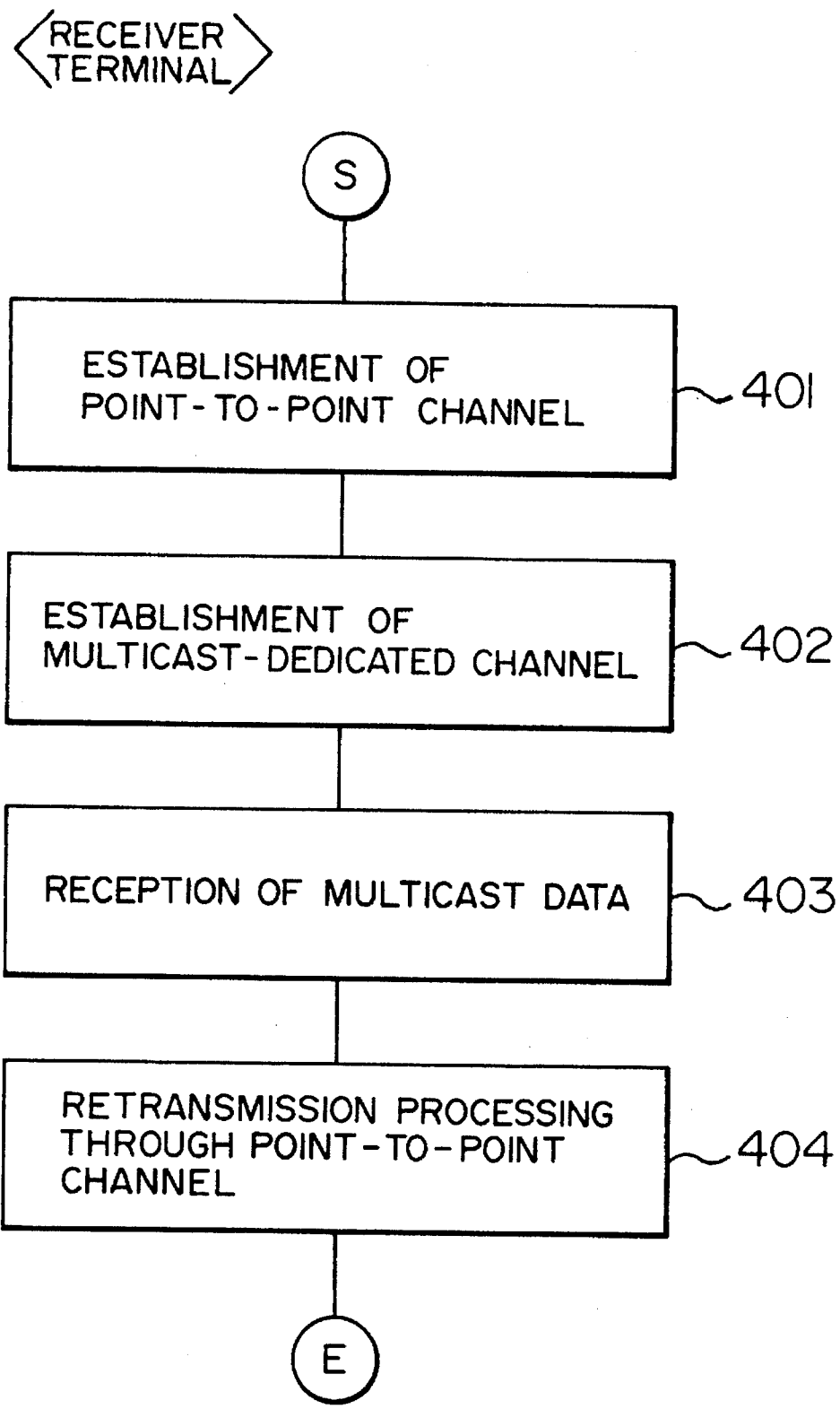
FIG. 4 is a flow chart for illustrating schematically processings executed by a receiver terminal in a system according an embodiment of the present invention.

FIG. 4 is a flow chart for illustrating schematically a processing executed by the receiver terminals (the nodes B, C, D in FIG. 2) according to an embodiment of the invention.

Referring to FIG. 4, in a step 401, a point-to-point channel is made in correspondence to the step 101 in FIG. 1. Generally, the terminal which requires establishment of the connection is referred to as the client terminal or simply as the client, while the terminal or unit to which the request for establishment of the connection is issued or directed is referred to as the server terminal or simply as the server. In the step 401, the receiver terminal, e.g. the terminal B of FIG. 2, plays a role as the server.

In a step 402, the multicast channel is made. Since no connection can be established with the multicast channel, it is impossible to know at what timing the information frames reach the receiver terminals. Accordingly, in this step 402, such sort of processing which allows the information frames to be received whenever they reach the receiver terminals is executed. By way of example, this processing may include a stand-by processing which is continued to be executed till the arrival of the information frames.

In a step 403, the information frames transmitted through the multicast channel established in the step 103 are received.

In a step 404, error such as drop-out of the information frame due to transmission failure or the like is detected, whereupon a retransmission request is issued to the sender terminal by making use of the point-to-point channel, which is then followed by a reception processing for receiving the information frame retransmitted from the sender terminal.

In this way, a highly reliable transmission system can be realized, which system ensures a high efficiency as well.

Next, description will turn to an embodiment of the invention which is directed to a system and a method for transmitting a large amount of data with high efficiency and high reliability without affecting any other processings.

Figure 5A:
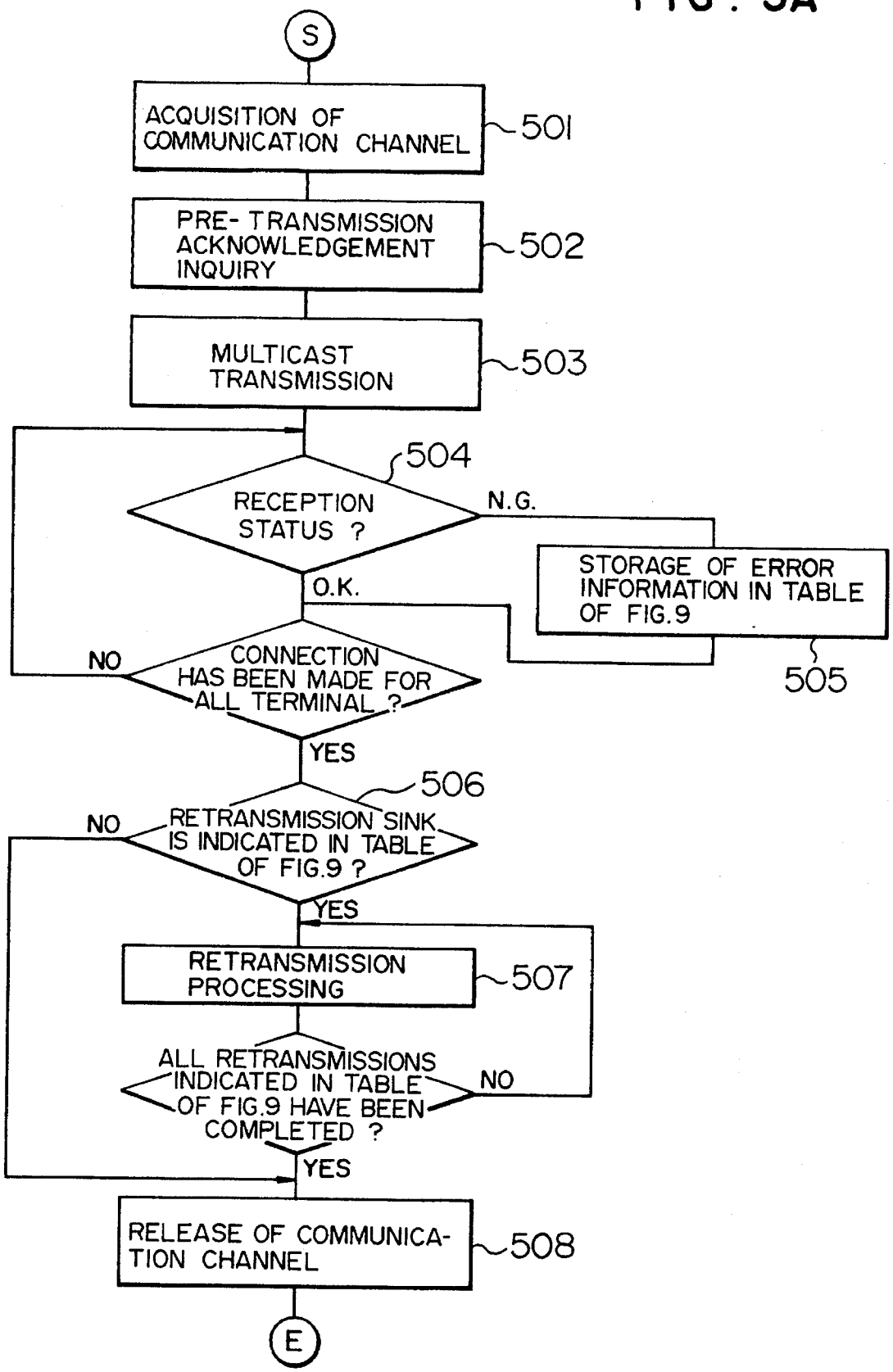
FIG. 5A is a flow chart showing in detail a flow of processings executed by a sender terminal according to the embodiment shown in FIG. 1.

FIG. 5A is a flow chart showing a flow of processings executed by a sender terminal in the system according to the instant embodiment.

Referring to FIG. 5A, in a step 501, processings similar to those described previously in conjunction with the steps 101 and 102 is performed. In the course in which the point-to-point channels have been made with the sender terminal, no establishment of the connection is marked or defined by setting a flag indicating "NO CONNECTION".

Figure 7:
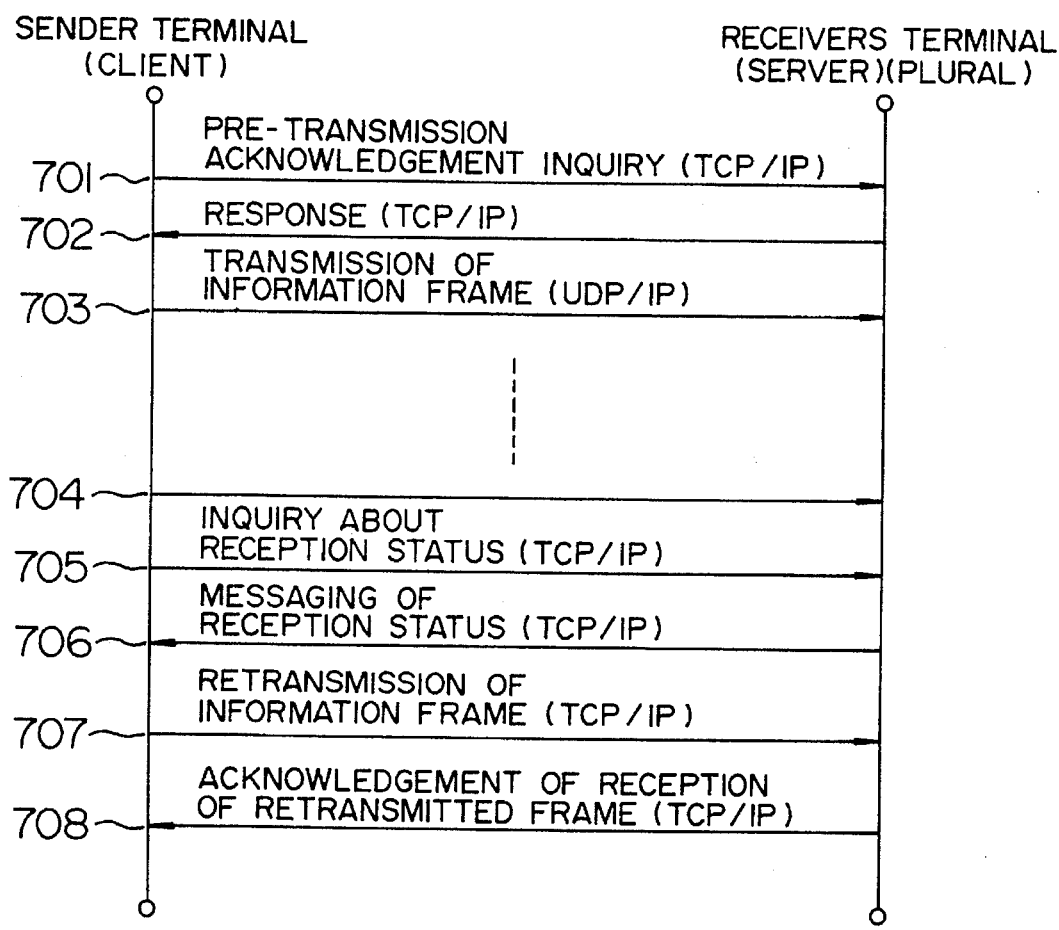
FIG. 7 is a diagram for illustrating transaction or transfer of information frame between a sender terminal and a receiver terminals in a system according to an embodiment of the invention.

In a step 502, a pre-transmission acknowledgement inquiry is performed by utilizing the point-to-point channel. In the case of the instant embodiment, it is presumed that the sender terminal supervises a plurality of destination or sink terminals to which the information frame is to be sent. Thus, because of presence of plural destination terminals (e.g. the terminals B, C and D shown in FIG. 2), the acknowledgement processing mentioned above may be realized in a polling scheme. That is, acknowledgement is sequentially inquired for the plurality of sink terminals. FIG. 7 shows transfers of the information frame between the source or sender terminal and the sink terminals. The above-mentioned processing is carried out through steps 701 and 702 shown in FIG. 7.

Figure 8:
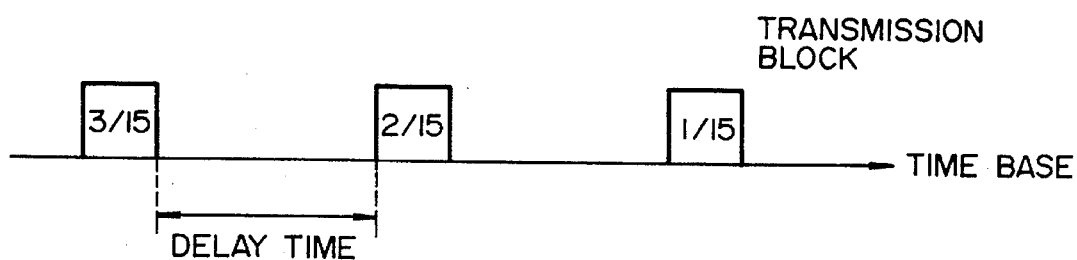
FIG. 8 is a timing diagram illustrating a delay-intervening block-based transmission for avoiding influence to other processings performed by a receiver terminal.

Turning back to FIG. 5A, in a step 503, the information frames are transmitted through the multicast channels to the sink terminals from which the pre-transmission acknowledgement has been received in the step 502. More specifically, in this step 503, the information frame is divided into a plurality of blocks with a delay time (inter-block gap time) being interposed between the successive blocks being transmitted. This is for the purpose of realizing the transmission of a large amount of data without exerting influence to any other processings carried out in the sender terminal. FIG. 8 is a timing diagram for illustrating the delay-intervening block-based transmission mentioned above. In FIG. 8, the time base is taken along the abscissa. Further, it is assumed that the information frame is divided into fifteen blocks which are affixed with serial ID numbers for management thereof. In FIG. 8, there are shown three blocks identified by 1/15, 2/15 and 3/15, respectively. In this conjunction, it should also be mentioned that the delay time mentioned above is determined by taking into account a permissible increase rate in a CPU load of the sink or receiver terminal, a reception buffer capacity of the receiver terminal, the time taken for the transmission of the whole information frame, etc. By way of example, let's assume that the delay time is to be determined on the basis of the load rate of the CPU. Assuming that each unit block for transmission includes X packets each of one kilobyte, the delay time intervening between the successive blocks being transmitted is Y seconds, the time taken for the CPU of the receiver terminal to receive the information of one packet is T milliseconds, and that the increase in the CPU load rate of the receiver terminal is to be suppressed to within Z %, then the delay time Y is given by $$Y = X*T/1000/(Z/100) \quad (1)$$

As a numerical example, assuming that X=20, T=15 and Z=10. In that case, the delay time Y may be three seconds, because $$Y = 20*0.015/0.1 = 3 \text{ sec.}$$

Figure 5B:
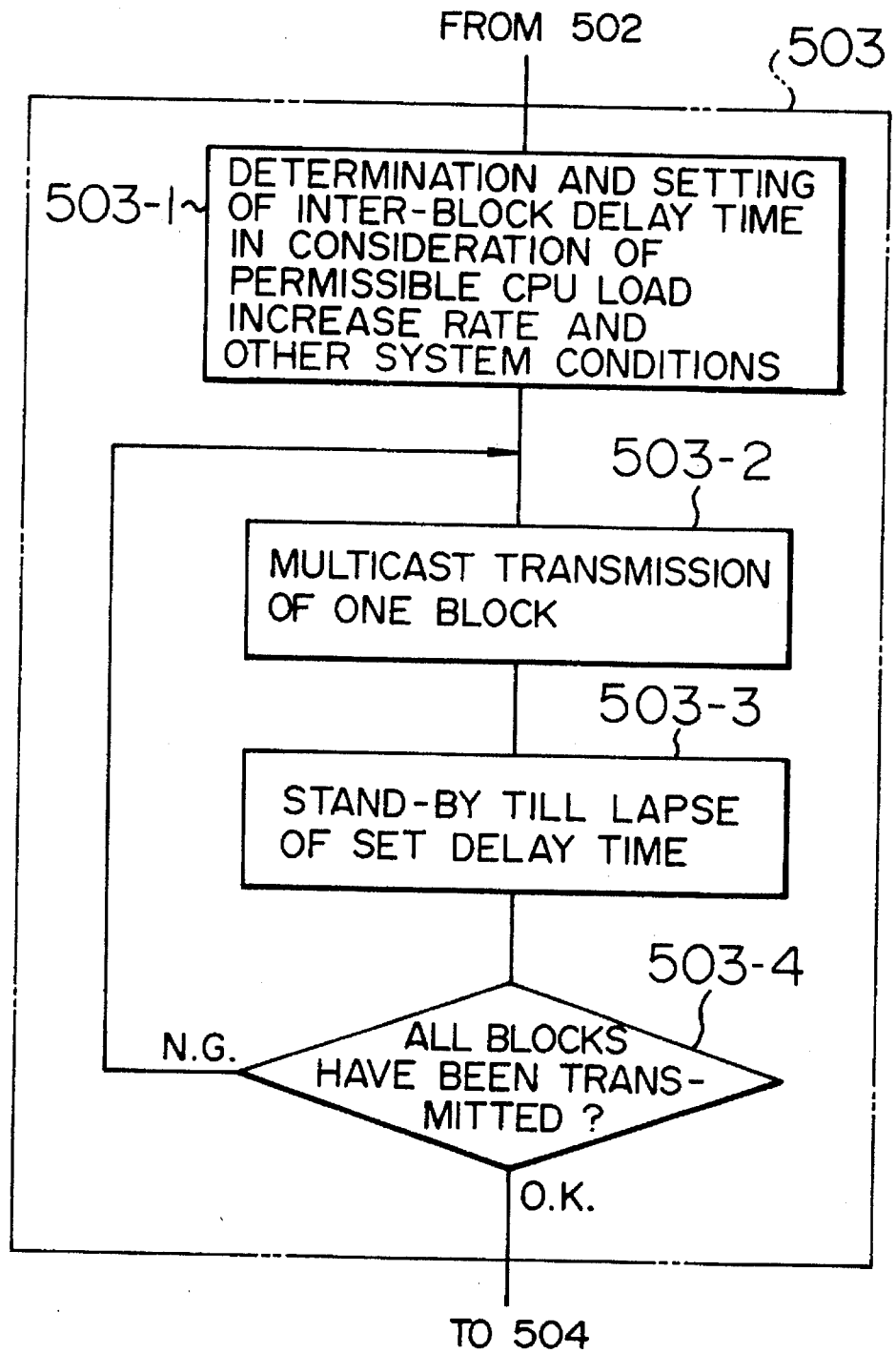
FIG. 5B is a flow chart showing in detail a multicast transmission step 503 in FIG. 5A.

In more concrete, the above-mentioned step 503 may include steps 503-1 to 503-4 shown in FIG. 5B.

Referring to FIG. 5B, in the step 503-1, the delay time Y is calculated in accordance with the abovementioned expression (1) on the basis of the permissible CPU load increase rate Z(%), the number of blocks and overhead of the receiver terminal CPU involved in the reception each determined previously, whereon the delay time is inserted between the information blocks for transmission in the processing steps which follow. Parenthetically, in case the reception overhead of the CPU and the permissible CPU load increase rate differ from one to another receiver terminal, the maximum value determined from the expression (1) may be selected as the valid delay time Y.

In the step 503-2, X packets constituting one block are successively sent to a plurality of receiver terminals through the multicast channel without acknowledgement by using the UDP/IP protocol. This step corresponds to one of the steps 703 to 704 shown in FIG. 7.

Next, in the step 503-3, the sink (or receiver) terminals are each set to the stand-by state for a period corresponding to the delay time Y set in the step 503-1 after every transmission of one block of data. In that case, when the source or sender terminal is allocated with any other task to be executed during the stand-by time, that task is performed. Otherwise, the sender terminal CPU remains in the idling state.

In the step 503-4, decision is made after laps of the preset delay time as to whether or not all the information blocks of the predetermined number have been transmitted. When any block remains to be sent, the step 503-2 is resumed.

Turning back to FIG. 5A, in a step 504, confirmation of the reception status is performed through the polling by utilizing the point-to-point channel in a manner similar to the aforementioned step 502. The processing in the instant step 504 corresponds to the steps 705 and 706 shown in FIG. 7. When the content of the information received by one receiver terminal is normal, the reception status of another receiver terminal is inquired. Such inquiry of the reception status is performed in the sequence in which the point-to-point channel has been established (i.e., in the sequence in which the connection has been made).

On the other hand, in case the status of reception is found abnormal as the result of the decision made in the step 505, the serial ID number of the information frame suffering error ("NO CONNECTION ESTABLISHED") is stored in a retransmission table of the source or sender terminal in a step 505, which table is shown in FIG. 9. By way of example, let's assume that in the network structure shown in FIG. 2, the connection has been established from the terminal A to the sink terminals B, C and D in this order and that the third one of the fifteen information blocks sent to the terminal D has been found not received by the terminal D due to transmission error as the result of the inquiry polling. In that case, a flag such as "*" is set in the corresponding area of the retransmission table shown in FIG. 9 to thereby allow the block-based information frame to be retransmitted to the terminal D.

In a step 506, it is checked whether there is registered the information to be retransmitted in the retransmission table shown in FIG. 9. When no information to be retransmitted is registered, i.e., when it is decided that the information frames have been received by all the sink or receiver terminals without suffering from any transmission error, the processing proceeds to a step 508. Otherwise, the processing in a step 507 is performed.

Namely, in the step 507, the information frame represented by the serial block ID number as registered in the table of FIG. 9 is retransmitted to the receiver terminal indicated by the flag "*" ("NO CONNECTION ESTABLISHED") which is also stored in the retransmission table of FIG. 9. In the case of the example now under consideration, the information frame retransmission is performed for the block suffering the transmission error on the presumption of poor channel quality. It should however be understood that in the case where the channel quality is satisfactory, only the flag indicating "NO CONNECTION ESTABLISHED" may be stored in the retransmission table and the whole information frame may be retransmitted, starting from the first block. The processing in the step 507 of FIG. 5A corresponds to the steps 707 and 708 shown in FIG. 7.

In a step 508, the point-to-point channel and the multicast channel made in the step 501 are broken or removed.

Figure 6A:
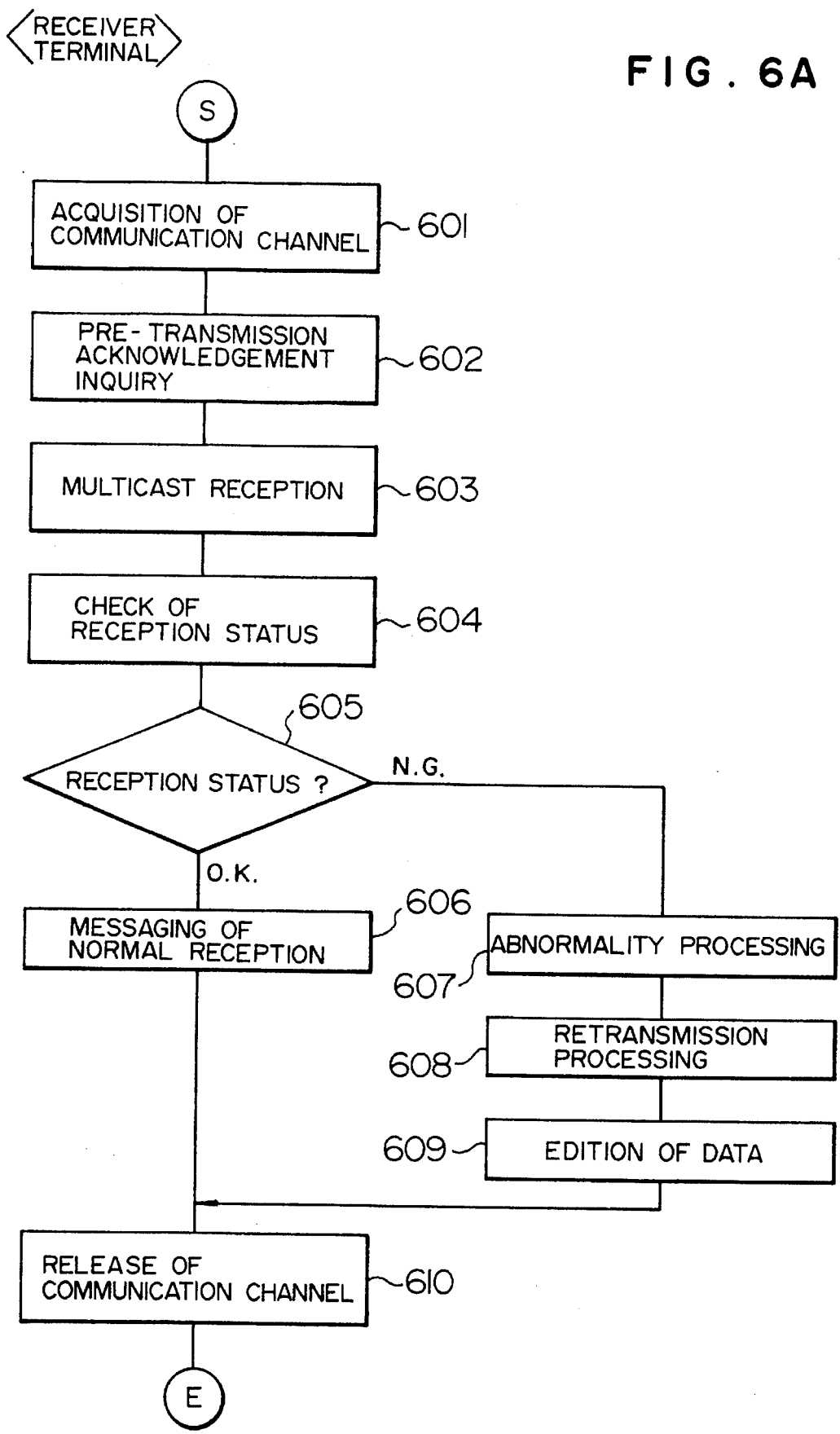
FIG. 6A is a flow chart for illustrating processing steps executed by a receiver terminal in the system according to an embodiment of the invention.

FIG. 6A is a flow chart for illustrating the processing steps executed in each of the sink or receiver terminals.

Referring to FIG. 6A, the communication channel is made in correspondence to the step 501 shown in FIG. 5A.

In a step 602, an answer is returned in response to the pre-transmission acknowledgement inquiry issued in the step 502 mentioned previously. On the basis of this answer, the sender terminal can confirm that the receiver terminals are sound. In this conjunction, it should be noted that the receiver terminal may make the multicast channel at the time point when it receives the pre-transmission acknowledgement inquiry.

In a step 603, data reception processing is performed for receiving the information frames broadcast through the multicast channel.

Figure 6B:
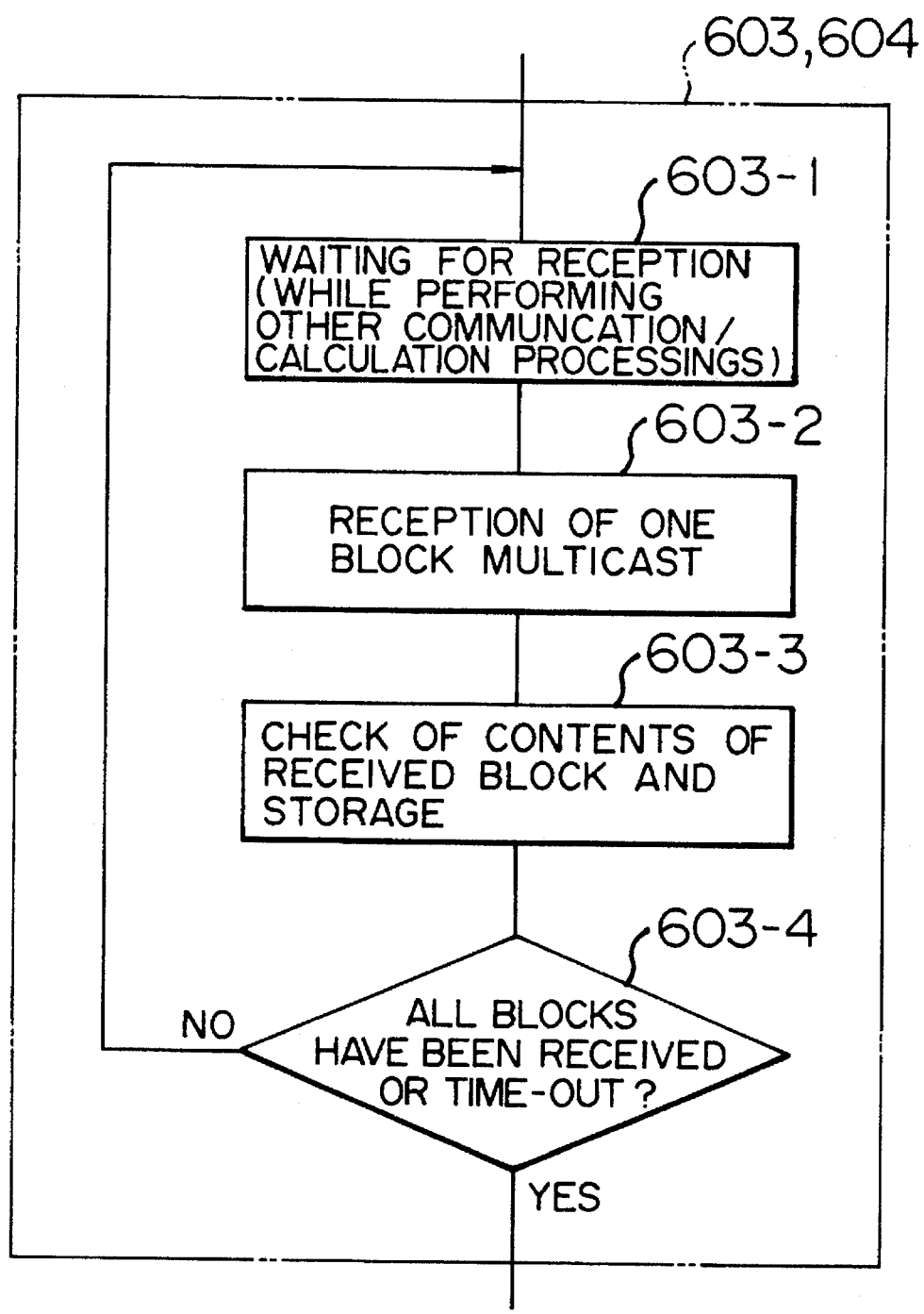
FIG. 6B is a flow chart for illustrating an example of communication conflict control performed in steps 603 and 604 shown in FIG. 6A.

This step 603 may be considered as including steps 603-1 to 603-4 shown in FIG. 6B.

More specifically, referring to Fig, 6B, in the step 603-1, the receiver terminal is set to the state waiting for reception of the information frame sent through the multicast channel in the step 503 (corresponding to one of the steps 703 and 704 in FIG. 7). During a period corresponding to the reception-ready state, the receiver terminal may perform other task, if any, in precedence to performing actually the reception processing in the subsequent step. In this conjunction, it is noted that unless the delay time is interposed between the successive blocks as received, a periodical communication of a short duration carried out by the receiver terminal as another task by using the communication procedure including no reception acknowledgement (UDP/IP or the like including no retransmission processing) may conflict with the reception of the large amount of data, which in turn may lead to a conflict in gaining a communication hardware buffer and occurrence of error in data fetching by a running application program due to an excessive CPU load rate. In contrast, when the delay time intervening between the successive data blocks is employed as in the case of the instant embodiment of the invention, the probability of overflow of the communication hardware buffer can be suppressed lower than a predetermined allowable value while the influence of overhead of the CPU can be mitigated to such a level that the CPU load rate capable of evading error in fetching the received data by the application program is maintained. In other words, according to the teaching of the invention incarnated in the instant embodiment, conflict in the communication can positively be prevented, as a result of which the reliability of the other periodical communications performed without acknowledgement can be maintained, as it is, while excluding extraneous processing overhead involved otherwise by the retransmission processing for the large amount of data.

In the step 603-2, the information frame sent out through the multicast channel is received on a block-by-block basis by using the UDP/IP protocol.

In the step 603-3, block drop-out and/or data falsification of the received information frame are detected. When such abnormality is detected, the serial ID number of the relevant block is stored in a predetermined area of a memory incorporated in the receiver terminal. Further, when the blocks are stored in the storage areas such as of a main memory, disk equipment or the like, the memory location or area for the block suffering the abnormality is also secured as it is. This process is illustrated in concrete in FIG. 10 on the assumption that the third one of the fifteen blocks constituting one information frame drops out due to some transmission error. In this case, a memory area shown by hatching is secured, and the fourth block as received is stored in the succeeding area identified by "4/15".

On the other hand, when no abnormality is detected, a sign or flag indicating normality is stored or set.

Finally, in the step 603-4, when reception processing has been completed for all the incoming information blocks or the duration of the reception-ready standby state exceeds a predetermined time (i.e., upon occurrence of time-out), the reception status inquiry is waited for in a subsequent step 605 (corresponding to the step 705 in FIG. 7).

Now in the step 605, the information stored in the step 604 is messaged to the sender terminal. It should be noted that this step 605 is activated only in response to the inquiry about the reception status performed in the step 504 described hereinbefore and corresponding to the step 705 in FIG. 7.

When the reception of the information is carried out, a step 606 is executed for messaging the normal reception to the sender terminal.

In the case of abnormal reception, a step 607 is performed to inform the sender terminal of the serial number identifying the abnormal data block.

In a step 608, the block data corresponding to the block ID number messaged to the sender terminal in the abovementioned step 607 is received by the relevant receiver terminal.

In a step 609, the data block is edited by using the block ID information received in the step 608. In the case of the example illustrated in FIG. 10, the data of the third block is received and stored in the memory area identified by "3/15".

In a step 610, the communication link made at the step 601 is broken or released.

Through the processing procedure described above, an enormous information frame can be transmitted to the sink or receiver terminals with a high efficiency and a high reliability without affecting any other processings performed by the receiver terminal. At this juncture, it should however be noted that the sender terminal is required to know previously the address of the counterpart terminal(s) (i.e., receiver terminals) to which the information frame is to be sent. In the following, another embodiment of the invention in which the sender terminal need not know previously the address of the receiver terminal will be described.

Figure 11:
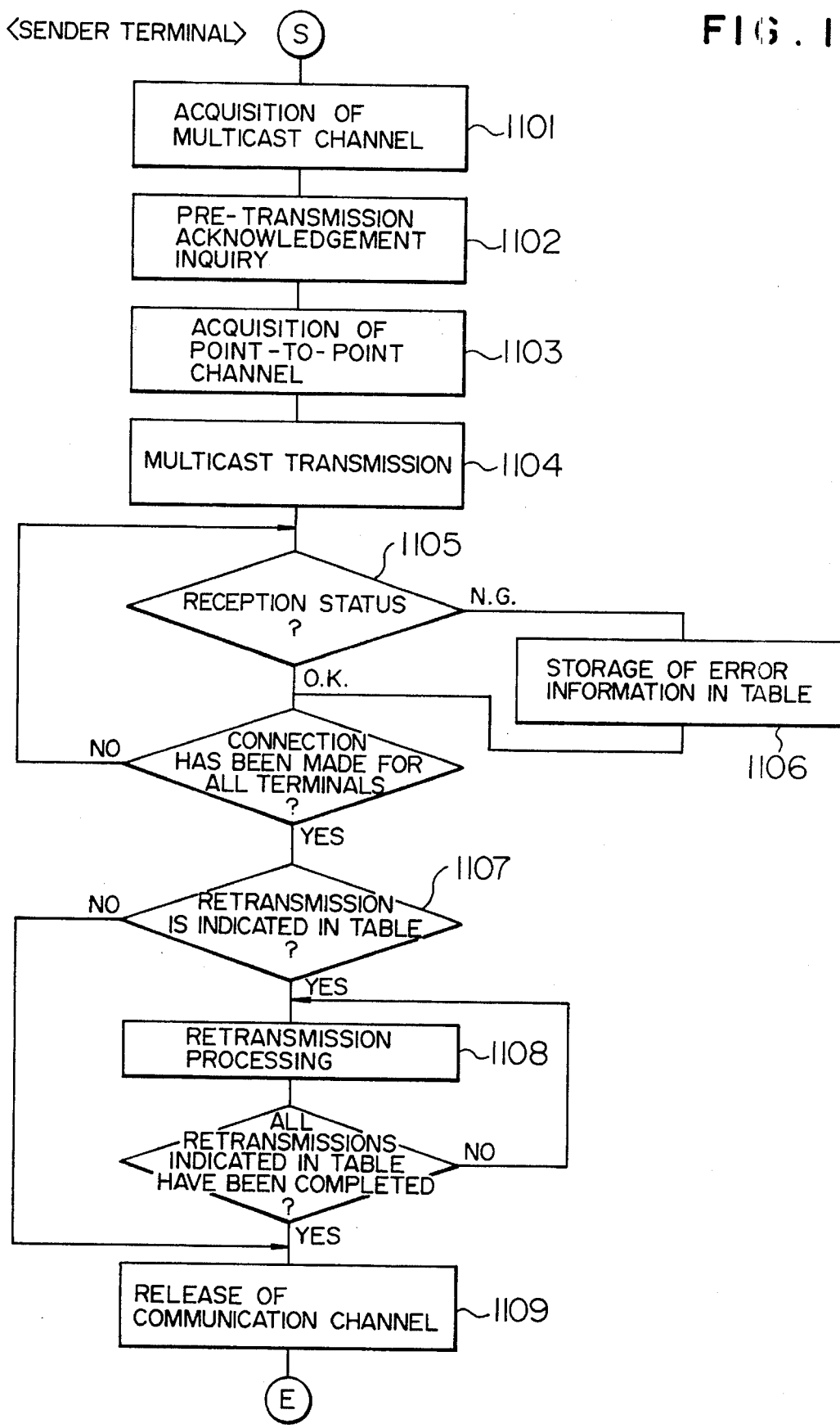
FIG. 11 is a flow chart showing a processing procedure performed by a sender terminal in a system according to another embodiment (second embodiment) of the invention.

FIG. 11 is a flow chart showing a processing procedure performed by a sender terminal in the system according to the instant embodiment of the invention.

Referring to FIG. 11, in a step 1101, a multicast communication channel is made in the same manner as described hereinbefore in conjunction with the step 102 shown in FIG. 1.

Figure 13:
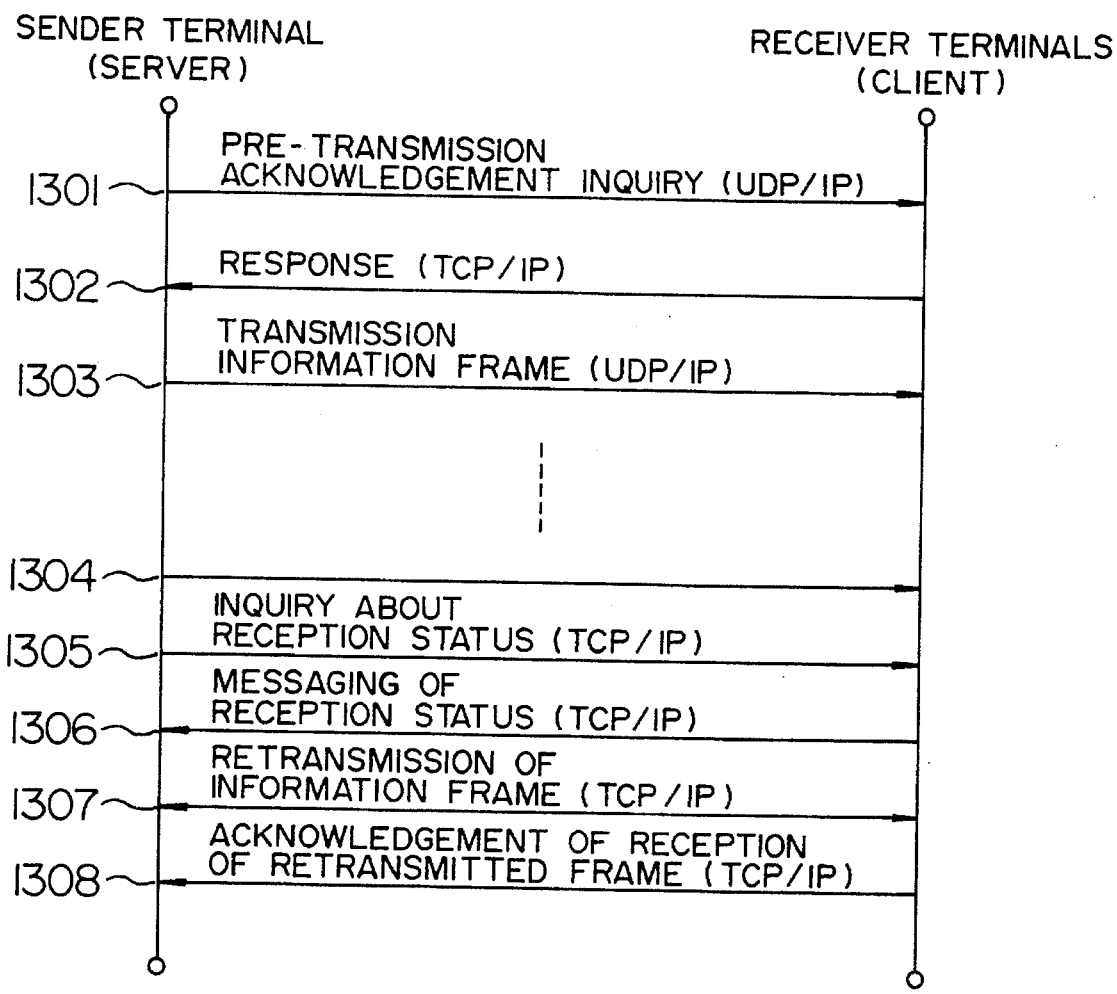
FIG. 13 is a diagram showing interactions performed between sender and receiver terminals for transmission/reception of information frame.

In a step 1102, the sender terminal issues a message to the receiver terminals to the effect that information frames are sent to them by using the multi-cast communication channel. FIG. 13 is a diagram showing interactions performed between the sender and receiver terminals for the transmission/reception of the information or data frame. The abovementioned processing is executed in a step 1301 shown in FIG. 13.

Now, turning back to FIG. 11, in a step 1103, the receiver terminal informs the reception of the aforementioned message to the sender terminal by issuing a request for establishing or making connection. In other words, the receiver terminal now plays a role of the client for making the point-to-point channel. By virtue of this feature, the sender terminal is get rid of a burden of knowing previously the receiver terminals to which the information frames are to be sent. This in turn means an enhancement in the system expansion susceptibility, differing from the preceding embodiments. The processing in this step 1103 corresponds to the processing step 1302 shown in FIG. 13. Parenthetically, a term "RESPONSE" inserted in FIG. 13 indicates the request for the establishment of connection.

In a step 1104 in FIG. 11, similar processing as that in the step 503 shown in FIG. 5B is executed. This step 1104 corresponds to the steps 1303 and 1304 in FIG. 13.

In a step 1105 in FIG. 11, similar processing as that of the step 504 is performed. This step 1105 corresponds to the steps 1305 and 1306 shown in FIG. 13.

In a step 1106, similar processing as that in the step 505 shown in FIG. 5A is performed.

In a step 1107, processing similar to that in the step 506 shown in FIG. 5A is performed.

In a step 1108 of FIG. 11, similar processing to that of the step 507 shown in FIG. 5A is executed. This step 1108 corresponds to the steps 1307 and 1308 in FIG. 13.

In a step 1109, processing similar to that of the step 508 of FIG. 5A is executed.

Figure 12:
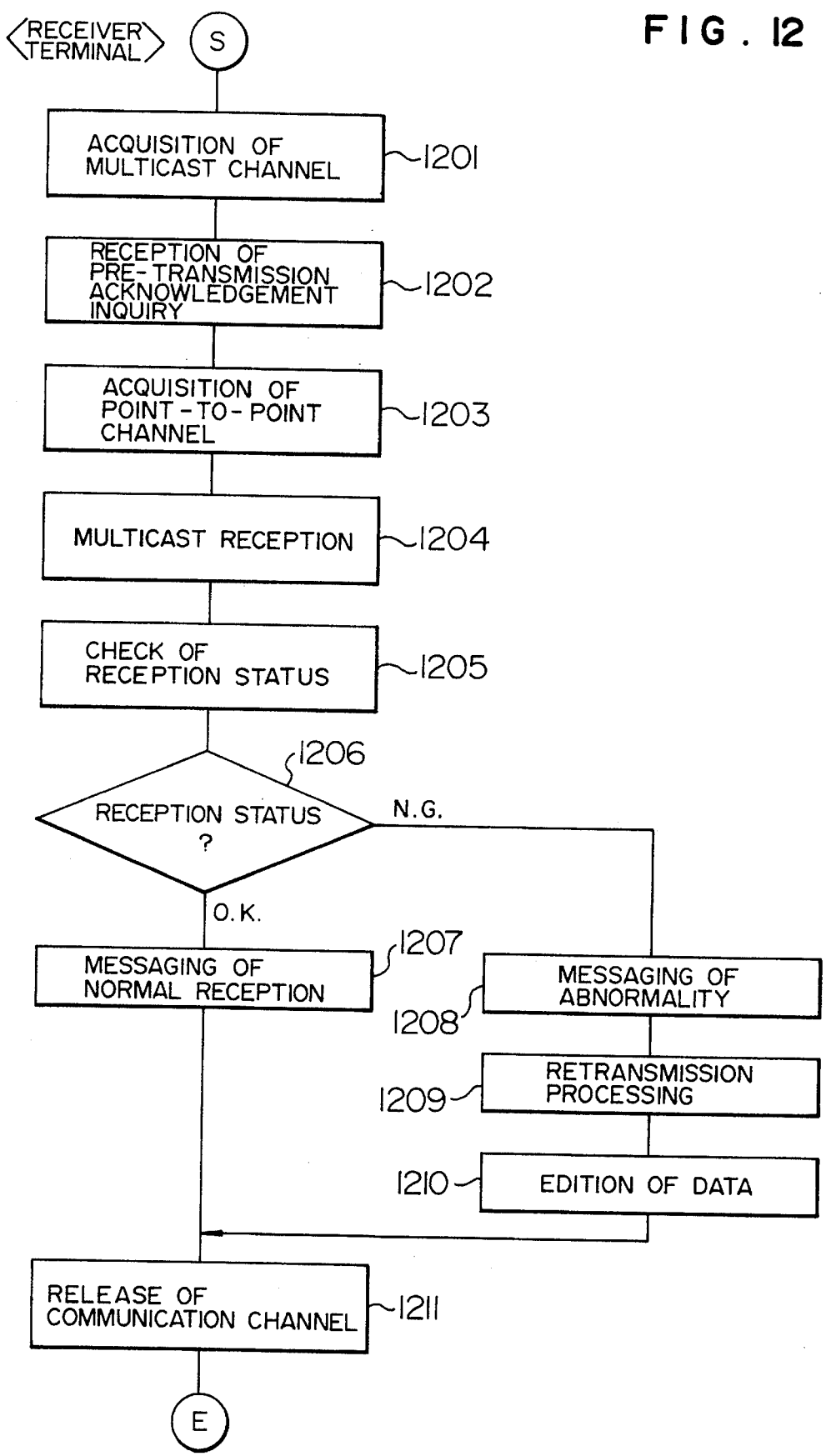
FIG. 12 is a flow chart showing a processing procedure performed by a receiver terminal in the system according to the second embodiment of the invention.

FIG. 12 is a flow chart showing a processing procedure performed by the receiver terminal in the system according to the instant embodiment of the invention.

Referring to FIG. 12, in a step 1201, the multicast communication channel is made in correspondence to the aforementioned processing executed by the sender terminal in the step 1101.

In a step 1202, the pre-transmission acknowledgement inquiry issued in the step 1102 by the sender terminal is received.

In a step 1203, the receiver terminal issues the request for establishment of connection to the sender terminal in response to a trigger signal for which the pre-transmission acknowledgement inquiry serves, whereby the point-to-point channel is made or established.

Processing steps 1204 to 1211 shown in FIG. 12 correspond to the processing steps 604 to 610 described hereinbefore by reference to FIG. 6A.

At this juncture, it should be mentioned that the pre-transmission acknowledgement inquiry sent from the sender terminal to the receiver terminal in the step 1202 and received by the latter in the step 1301 shown in FIG. 13 may be performed without resorting to the simple broadcast transmission. More specifically, the pre-transmission acknowledgement inquiry issued in the step 1301 may be added with a data content identifying code. In that case, in the step 1202, the receiver terminal checks the content identifying code as to whether it coincides with an identification code stored previously in the receiver terminal. Only when the coincidence is detected, the receiver terminal receives the pre-transmission acknowledgement inquiry in a selective manner, so to say.

Such broadcast with the content select code is described in detail in U.S. Pat. No. 4,366,479 owned by the present assignee and incorporated herein by reference. Parenthetically, the content code for the selective reception represents the content of the large amount of data transmitted in succession. Accordingly, with the arrangement mentioned above, only those of the candidate receiver terminals which require the large amount of data can establish the connection with the sender station.

Through the processing procedure described above, an enormous information frame (i.e., a large amount of information edited in a frame) can be transmitted to the receiver terminals with a high efficiency while suppressing to a minimum the influence to any other processings performed by the receiver terminal. Besides, the system expansion susceptibility or capability can be enhanced. It is however admitted that the reliability of the data transmission in the system according to the instant embodiment is low as compared with that of the preceding embodiments.

Now, description will made of an application of the enormous data transmission technique according to the invention to a train or vehicle operation/service control system by way of example. However, it should be understood that the present invention is never restricted to such application but can find numerous applications in the various fields such as CIM (computer integrated manufacturing) and a wide-area power transmission system.

Again referring to FIG. 2, assuming that the unit A shown therein serves as a station for distributing a file of enormous train operation data derived from the time tables for individual train roads to the stations B, C and D, respectively, at a predetermined time interval, e.g. every predetermined number of days, for the purpose of updating the train operation or service data. To this end, each of the stations includes a programmed route controller having a CPU for controlling directly the train operation. Besides, sensors for detecting the presence of a train are provided along each rail road extending between the stations at a predetermined distance, e.g. of 500 m, wherein the detection signals outputted from the sensors are sent to the PRCs periodically at a predetermined interval, e.g. of a few seconds, for updating the train data in the respective programmed route controllers. Additionally, signals produced by the conventional signalling sensors are sent to the programmed route controller. These signals may well be referred to as the control data. However, because these data are intrinsically of short duration, no reception acknowledgement processing is performed. Under the circumstance, distributive (transfer) autonomous processings should preferably be carried out in the individual stations, respectively. The communication network 202 is constituted by a LAN system in which an optical fiber cable having a transmission rate, for example, of 100 M-bit rate is employed. When the file of enormous amount of data is to be broadcast to several hundred stations, there arises necessarily a demand for a rational data transmission method in order to evade conflict in channel acquisition with other inter-station communication of various train operation control data. In other words, when the data which requires a high reliability and a high efficiency in the transmission thereof such as the train operation data file are to be transmitted in mixing with the data such as the train position detection data which requires no acknowledgement because of the periodical transmission, it is important to allocate the transmission methods in dependence on the nature of the data for transmission. Under the circumstance, in the train operation control system to which the invention is applied, the train operation data file can be transmitted by adopting the transmission methods according to the invention. In that case, assuming, for example, that the train operation data file is of several mega bytes, the file is divided into blocks referred to as packets each of 1 K bytes to be broadcast to the individual stations.

We claim:

1. A data transmission method for transferring a large amount of data among a plurality of computer terminals through a network serving as a data transmission line to which said plurality of computer terminals are connected, comprising the steps of:

establishing on said network a first channel between a sender terminal and a receiver terminal, said first channel being a point-to-point channel;

sending from said sender terminal to said receiver terminal over a second channel on said network a plurality of information frames successively in accordance with a connectionless transmission protocol, said second channel being logically different from said first channel; and receiving from said receiver terminal by said sender terminal over said first channel a reception acknowledging information frame or alternatively a retransmission request information frame in accordance with a connection-oriented transmission protocol ensuring high reliability, and sending from said sender terminal to said receiver terminal over said first channel a frame of data to be retransmitted in response to said retransmission request information frame, if issued, in accordance with said connection-oriented transmission protocol of high reliability.

2. A data transmission method according to claim 1, wherein said receiver terminal is one of N receiver terminals, wherein N is an integer not less than two, and wherein said sending of said plurality of information frames is performed in the form of a one-to-N broadcast transmission in which said information frames are transmitted from said sender terminal to said N receiver terminals.

3. A data transmission method according to claim 2, wherein said receiving of said reception acknowledging information frame or alternatively said retransmission request information frame is realized by activating said N receiver terminals from the sender terminal side.

4. A data transmission method according to claim 2, wherein said sender terminal affixes an identification code for identifying the content of said data to said information frame, and wherein said data transmission method further comprises the steps of:

affixing to said information frame an identification code for identifying the content of said information frame; and receiving selectively said information frames by said N receiver terminals by discriminatively identifying the codes affixed to said information frames.

5. A data transmission method according to claim 1, wherein in precedence to transmission of said plurality of information frames, said sender terminal sends reception ready inquiry data to said receiver terminal and receives acknowledgement data from said receiver terminal in accordance with the connection-oriented protocol ensuring high reliability.

6. A data transmission method according to claim 1, further comprising the steps of:

sending from said sender terminal to said receiver terminal through a broadcast transmission reception ready inquiry data affixed with an identification code identifying the content of said information frame in precedence to transmission of said plurality of information frames;

identifying discriminatively said code at the receiver terminal; and sending acknowledgement data to said sender terminal from the receiver terminal received selectively said reception ready inquiry data in accordance with the connection-oriented protocol ensuring high reliability.

7. A data transmission method according to claim 1, wherein said connectionless transmission protocol is a user datagram protocol/internet protocol, and said connection-oriented transmission protocol ensuring high reliability is a transmission control protocol/internet protocol.

8. A data transmission method for transferring a large amount of data among a plurality of computer terminals through a network serving as a data transmission line to which said plurality of computer terminals are connected, comprising the steps of:

establishing on said network a plurality of first channels between a particular one of said terminals and other ones of said terminals, each of said first channels being a point-to-point channel established between said particular terminal and a respective one of said other terminals;

sending from said particular terminal to said other terminals over a second channel on said network a plurality of information frames successively in accordance with a transmission protocol requiring no acknowledgement of reception, said second channel being logically different from said first channels; and receiving from said other terminals by said particular terminal over respective ones of said first channels a reception acknowledging information frame or alternatively a retransmission request information frame in accordance with a transmission protocol requiring acknowledgement of reception, and sending from said particular terminal to any of said other terminals which issued said retransmission request information frame over a respective one or ones of said first channels a retransmission data frame in accordance with said transmission protocol requiring acknowledgement of reception.

9. A data transmission system for transferring a large amount of data among a plurality of computer terminals through a network serving as a data transmission line to which said plurality of computer terminals are connected, comprising:

means for establishing on said network a first channel between a sender terminal and a receiver terminal, said first channel being a point-to-point channel;

first transmission means for sending from said sender terminal to said receiver terminal over a second channels on said network a plurality of information frames successively in accordance with a connectionless transmission protocol, said second channel being logically different from said first channel;

reception means for receiving from said receiver terminal over said first channel a reception acknowledging information frame or alternatively a retransmission request information frame in accordance with a connection-oriented transmission protocol ensuring high reliability; and second transmission means for sending to said receiver terminal over said first channel a frame of data to be retransmitted in response to said retransmission request information frame, if issued, in accordance with said connection-oriented transmission protocol of high reliability.

10. A data transmission system according to claim 9, wherein said receiver terminal is one of N receiver terminals, wherein N is an integer not less than two, and wherein said sending of said plurality of information frames is performed in the form of a one-to-N broadcast transmission in which said information frames are transmitted from said sender terminal to said N receiver terminals.

11. A data transmission system according to claim 10, wherein said reception means for receiving said reception acknowledging information frame or alternatively said retransmission request information frame includes means for activating said N receiver terminals from the sender terminal side.

12. A data transmission system according to claim 10, wherein said sender terminal affixes an identification code for identifying the content of said data to said information frame, and wherein said data transmission system further comprises:

means for affixing to said information frame an identification code for identifying the content of said information frame; and broadcast reception means for receiving selectively said information frames by discriminatively identifying the codes affixed to said transmission information frames in said N receiver terminals.

13. A data transmission system according to claim 9, wherein said sender terminal includes means for sending reception ready inquiry data to said receiver terminal in precedence to transmission of said plurality of information frames and receiving acknowledging data from said receiver terminal in accordance with the connection-oriented protocol ensuring high reliability.

14. A data transmission system according to claim 9, further comprising:

first transmission means for sending through a broadcast transmission to said receiver terminal from said sender terminal reception ready inquiry data affixed with identification codes identifying the contents of said information frames in precedence to transmission of said plurality of information frames;

identifying means for identifying discriminatively said codes at the receiver terminals; and second transmission means for sending reception ready acknowledging data to said sender terminal from the receiver terminal received selectively said reception ready inquiry data in accordance with the connection-oriented protocol ensuring high reliability.

15. A data transmission system according to claim 9, wherein said connectionless transmission protocol is a user datagram protocol/internet protocol, and said connection-oriented transmission protocol ensuring high reliability is a transmission control protocol/internet protocol.

16. A data transmission system for transferring a large amount of data among a plurality of computer terminals through a network serving as a data transmission line to which said plurality of computer terminals are connected, comprising:

means for establishing on said network a plurality of first channels between a particular one of said terminals and other ones of said terminals, each of said first channels being a point-to-point channel established between said particular terminal and a respective one of said other terminals;

first transmission means for sending from said particular terminal to said other terminals over a second channel on said network a plurality of information frames successively in accordance with a transmission protocol requiring no acknowledgement of reception, said second channel being logically different from said first channels;

reception means for receiving from said other terminals over respective ones of said first channels a reception acknowledging information frame or alternatively a retransmission request information frame in accordance with a transmission protocol requiring acknowledgement of reception; and second transmission means for sending from said particular terminal to any of said other terminals which issued said retransmission request information frame over a respective one or ones of said first channels a frame of retransmission data in accordance with said transmission protocol requiring acknowledgement of reception.

17. An object processing control system, comprising a plurality of stations each including a programmed object controller equipped with a computer, a data communication network to which said plurality of stations are connected, and a broadcasting station equipped with a computer for broadcasting a processing data file to said plurality of controllers through said network, each of said stations including:

detecting means for detecting actual processing status of the object undergoing a processing and transmitting periodically the detected data to the controller of the associated station; and means for processing said object based on data and/or commands from said controller;

said broadcasting station including:

means for establishing on said network a plurality of first channels between said broadcasting station and said stations, each of said first channels being a point-to-point channel established between said broadcasting station and a respective one of said stations;

means for dividing said processing data file into a plurality of successive information blocks; and means for setting a delay time between said successive information blocks, said delay time being determined on the basis of a load increase rate of the computer of each station and/or an interval at which said detection data is periodically transmitted to said controller;

wherein said information blocks and said detection data are transmitted on a connectionless transmission service basis over a second channel on said network, said second channel being logically different from said first channels, while reception of a reception acknowledging information frame for acknowledging the reception of said information blocks and transmission of a retransmission information frame are performed on a connection-oriented transmission service basis over said first channels.

18. A traffic control system, comprising a plurality of control nodes located in transportation paths each including a programmed route controller equipped with a computer, a data communication network to which said plurality of control nodes are connected, and a broadcasting node equipped with a computer for broadcasting a vehicle operation data file to said plurality of controllers through said network, each of said control nodes including:

a plurality of sensor means for detecting actual vehicle operation status between the control nodes to generate data indicative of the status and transmitting periodically the generated data to the controller of the associated nodes; and control means for controlling the vehicle operation in accordance with data and/or commands from said controller;

said broadcasting node including:

means for establishing on said network a plurality of first channels between said broadcasting node and said control nodes, each of said first channels being a point-to-point channel established between said broadcasting node and a respective one of said control nodes;

means for dividing said vehicle operation data file into a plurality of successive information blocks; and means for setting a delay time between said successive information blocks, said delay time being determined on the basis of a load increase rate of the computer of each control node and/or an interval at which said detection data is periodically transmitted to said controller;

wherein said information blocks and said detection data are transmitted on a connectionless transmission service basis over a second channel on said networks, said second channel being logically different from said first channels, while reception of a reception acknowledging information frame for acknowledging the reception of said information blocks and transmission of a retransmission information frame are performed on a connection-oriented transmission service basis over said first channels.

19. A traffic control system according to claim 18, wherein said broadcasting node is constituted by a particular one of said plurality of control nodes.

20. A data transmission method for transferring a large amount of data among a plurality of computer terminals through a network serving as a data transmission line to which said plurality of computer terminals are connected, comprising the steps of:

establishing on said network a first channel between a sender terminal and a receiver terminal, said first channel being a point-to-point channel;

sending from said sender terminal to said receiver terminal over a second channel on said network a plurality of information frames successively in accordance with a connectionless transmission protocol, said second channel being logically different from said first channel; and receiving from said receiver terminal by said sender terminal over said first channel a reception acknowledging information frame or alternatively a retransmission request information frame in accordance with a connection-oriented transmission protocol ensuring high reliability, and sending from said sender terminal to said receiver terminal over said first channel a frame of data to be retransmitted in response to said retransmission request information frame, if issued, in accordance with said connection-oriented transmission protocol of high reliability;

wherein the sending step includes the step of:

dividing each of said information frames into blocks and interposing a delay time between said blocks upon sending thereof for controlling data flow, said delay time being so determined that increase in a CPU load in each of said terminals is suppressed or no conflict takes place between said transmission of a large amount of data and other communication performed between said terminals;

wherein said delay time is set on the basis of a permissible load increase rate of the CPU and overhead of the CPU per unit transmission rate in said receiver terminal or said sender terminal and the number of blocks resulting from division of one information frame.

* * * * *